No. 642,370. Patented Jan. 30, 1900.
J. H. ROLLINS.
PROTECTOR FOR FRUITS OR VEGETABLES.
(Application filed Aug. 26, 1899.)
(No Model.) 2 Sheets—Sheet 1.
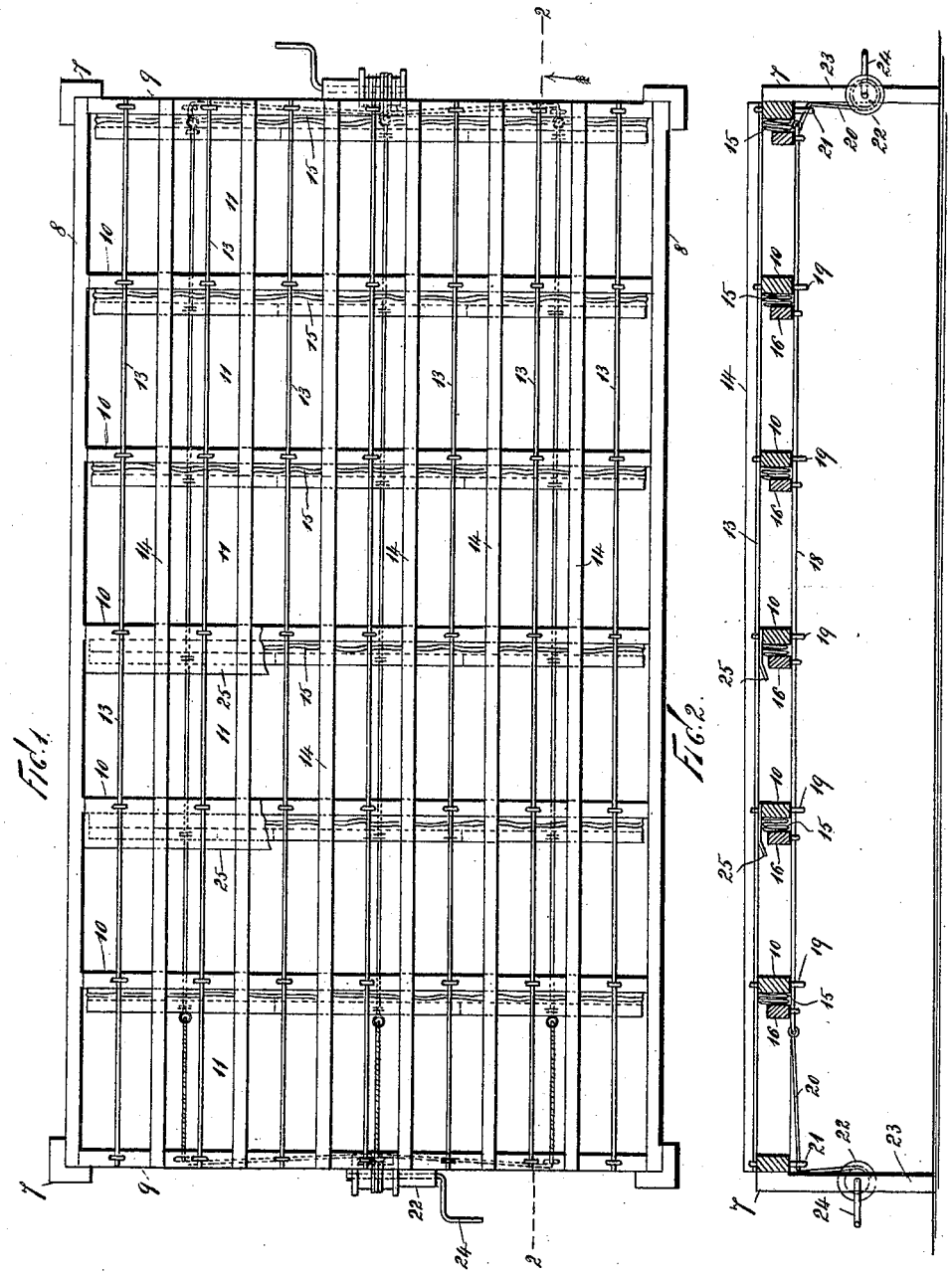
WITNESSES
INVENTOR
John H. Rollins
BY
Edgar Tatete
ATTORNEYS No. 642,370. Patented Jan. 30, 1900.
J. H. ROLLINS.
PROTECTOR FOR FRUITS OR VEGETABLES.
(Application filed Aug. 26, 1899.)
(No Model.) 2 Sheets—Sheet 2.
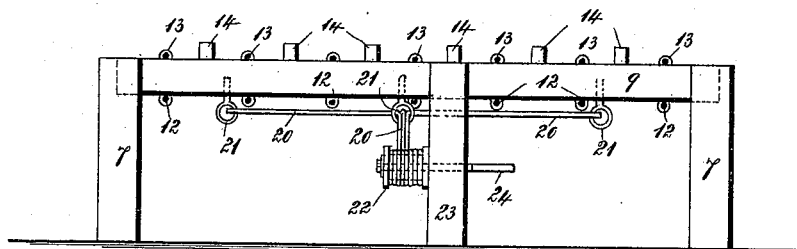
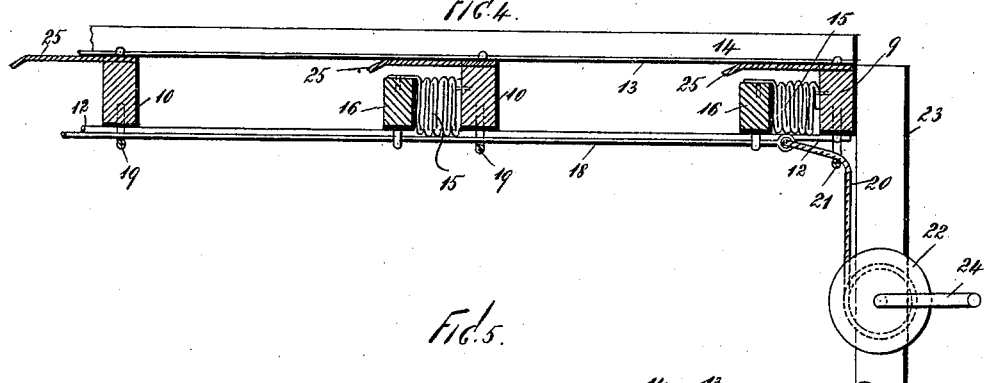
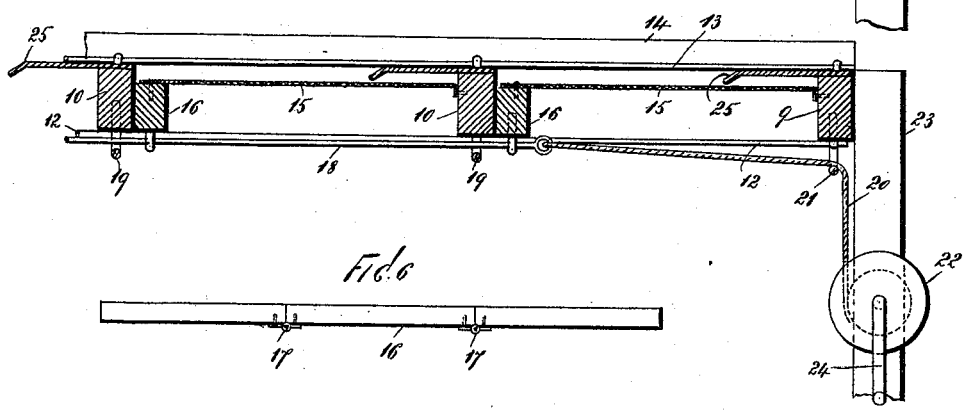

UNITED STATES PATENT OFFICE.

JOHN HENRY ROLLINS, OF ORLANDO, FLORIDA.

PROTECTOR FOR FRUITS OR VEGETABLES.

SPECIFICATION forming part of Letters Patent No. 642,370, dated January 30, 1900.

Application filed August 26, 1899. Serial No. 728,549. (No model.)

*To all whom it may concern:*

Be it known that I, JOHN HENRY ROLLINS, a citizen of the United States, residing at Orlando, in the county of Orange and State of Florida, have invented certain new and useful Improvements in Covers or Protectors for Fruits or Vegetables, of which the following is a full and complete specification, such as will enable those skilled in the art to which it appertains to make and use the same.

This invention relates to apparatus for covering and protecting pineapples and other fruits and vegetables from frost, freezing, and hot sunshine; and the object thereof is to provide an improved apparatus of this class which consists of a suitable frame or support, the top of which is divided into sections having flexible covers which are adapted to be drawn over said sections when necessary to form a complete cover or protector for the purpose specified and to be drawn compactly at one side of said sections when not required for the protection of the fruits or vegetables.

My invention is limited to the flexible covers for the separate sections of the main frame, the method of connecting the same with the main frame, and the method of moving said covers sidewise across the separate sections of the main frame, as hereinafter described and claimed; and the invention is fully disclosed in the following specification, of which the accompanying drawings form a part, in which—

Figure 1 is a plan view of the apparatus I employ; Fig. 2, a longitudinal section on the line 2 2 of Fig. 1; Fig. 3, an end view; Figs. 4 and 5, partial longitudinal sections on an enlarged scale, and Fig. 6 a side view of a detail of the construction.

In the drawings forming part of this specification the separate parts of my improvement are designated by the same numerals of reference in each of the views, and in the practice of my invention a suitable frame or support is provided, consisting of corner-posts 7, which are connected by horizontal and parallel side bars 8 and parallel end bars 9. The posts 7 may be of any desired height and the apparatus may be of any desired length and width, and the side bars 8 are connected by transverse parallel bars 10, by means of which the frame, composed of the side bars 8 and end bars 9, is divided into a plurality of equal transverse spaces 11, which, as shown in the drawings, are six in number, but which may be of any desired number.

Secured to the bottoms of the end bars 9 and the parallel cross-bars 10 are rods 12, (see Fig. 3,) and corresponding rods 13 (see Figs. 1, 2, and 3) are secured to the tops of said cross-bars and end bars, and the rods 12 are, as shown, preferably directly under the rods 13, and any desired number of these rods may be employed, and I also preferably secure to the upper side of the transverse bars 10 and end bars 9 longitudinal bars 14, six of which are shown in the drawings and the object of which will hereinafter appear.

The rods 12, which are secured to the bottom of the end bars and the cross-bars 10, are not shown in Fig. 2, said rods being omitted in order to make said figure clearer.

Secured to the inner side of one of the end bars 9, as shown at the right of Fig. 1, and to the corresponding sides of the edges of the cross-bars 10 are transverse strips 15 of flexible material, such as canvas, and secured to the free edge of each of said strips is a cross-bar 16, composed of separate sections hinged together, as shown at 17 in Fig. 6, to obtain greater flexibility of said cross-bars 16, whereby the latter may be operated with increased ease of movement. I also provide rods 18, which are shorter than the main frame of the apparatus, and which are rigidly connected with the bottom of each of the sections of the transverse bars 16, and which pass loosely through keepers 19, secured to the cross-bars 10, and connected with the opposite ends of each of the rods 18 is a rope or cord 20, and these ropes or cords 20 are passed through the keepers or pulleys 21, secured to the end bars 9, and connected with drums 22, the shafts of which pass through central posts 23, one at each end of the main frame, and are provided with cranks 24. By means of this construction it will be seen that by turning the drums 22 the rods 18 may be moved longitudinally of the main frame of the apparatus and will carry with them the cross-bars 16, to which the free edges of the transverse covering-strips 15 are secured. When the drum 22 at the left end of the frame is operated, the said flexible covering-strips will be drawn out, as shown in Fig. 5, so as to cover or close the spaces 11 between the transverse bars 10 on the end bars 9, and when the drum 22 is operated at the right-hand end of the frame the said transverse covering-strips 15 will be drawn compactly together, as shown in Figs. 1, 2, and 4.

The rods 12 and 13 serve as guides for the bars 16 and for the transverse covering-strips in the operations above described and retain said covering-strips and said bars 16 in proper position at all times, and by means of this construction it will be apparent that the entire bed of fruit or vegetables over which the shed is placed may be quickly covered whenever desired and fully protected from freezing, frost, and also from the hot rays of the sun when necessary. I also preferably secure to each of the transverse bars 14 strips 25 of any waterproof material which will serve as a protector and shield for the flexible covering-strips 15 when the latter are drawn together. Two of these shields or protectors are shown in Figs. 1 and 2 and three of them are shown in Figs. 4 and 5.

The entire apparatus is simple in construction and operation and well adapted to accomplish the result for which it is intended, and it will also be apparent that many changes in and modifications of the construction described may be made without departing from the spirit of my invention or sacrificing its advantages.

Although I have shown and described the construction of the main frame consisting of the corner-posts, side bars, and end bars, this part of the apparatus herein described is old and well known and forms no part of my invention, my invention being limited to the flexible strips or coverings 15 for the separate sections of the frame, said strips being secured at one side to one side of said sections of the frame and being provided at the opposite side with the bars 16, which are secured thereto, and said bars being secured to the connecting-rods 18, which run longitudinally of the main frame and by which the movable strips 15 are drawn sidewise across the separate transverse sections of the main frame in both directions.

Having fully described my invention, I claim as new and desire to secure by Letters Patent—

1. A cover or protector for fruits and vegetables, comprising a main frame divided into transverse sections by transverse bars, flexible strips of covering material secured to one of the end bars of the frame and said transverse bars, transverse bars secured to the free edges of said flexible strips, and means connected with said last-named bars for moving them longitudinally of the main frame in both directions, substantially as shown and described.

2. A covering or protector for fruits and vegetables, comprising suitable posts, a main frame, connected with said posts and divided into transverse sections by transverse bars, flexible strips of covering material secured to one of the end bars of the frame, and to said transverse bars, transverse bars secured to the free edges of said flexible strips and longitudinally-movable rods secured to the last-named bars and means for moving said rods longitudinally of the main frame in both directions, substantially as shown and described.

3. A covering for fruits and vegetables, comprising suitable posts, a main frame connected with said posts and divided into transverse sections by transverse bars, flexible strips of covering material secured to one of the end bars of the frame, and to said transverse bars, transverse bars secured to the free edges of said flexible strips and longitudinally-movable rods secured to the bottoms of said last-named bars and means for moving said rods longitudinally of the main frame in both directions, consisting of ropes connected with the opposite end thereof and passed over drums mounted at the ends of the frame, substantially as shown and described.

4. A covering for protecting fruits and vegetables, comprising a frame divided by transverse bars into separate sections, flexible strips of covering material secured to the inner side of one of the end bars of the frame and to the corresponding side of each of the transverse bars, other transverse bars composed of separate sections hinged together and secured to the free edges of each of said transverse strips, and means for moving the said last-named bars longitudinally of the main frame in both directions, substantially as shown and described.

5. A cover or protector for fruits and vegetables, comprising a main frame divided by transverse bars into separate sections, flexible strips of covering material secured to the inner side of one of the end bars of the frame and to the corresponding side of each of the transverse bars, other transverse bars composed of separate sections hinged together and secured to the free edges of each of said flexible strips, and means for moving the said last-named bars longitudinally of the frame in both directions, said frame being also provided at the top and bottom thereof with longitudinal rods between which the said flexible covering-strips are adapted to move, substantially as shown and described.

6. A cover for fruits and vegetables comprising a frame divided by transverse bars into separate sections, flexible strips of covering material secured to the inner side of one of the end bars of the frame and to the corresponding side of each of the transverse bars, other transverse bars composed of separate sections hinged together and secured to the free edges of each of said transverse strips, and means for moving the said last-named bars longitudinally of the frame in both directions, said frame being also provided at the top and bottom thereof with longitudinal rods between which the said flexible covering-strips are adapted to move, and with longitudinal bars which are secured to the top thereof, substantially as shown and described.

7. A cover or protector for fruits and vegetables, consisting of a frame composed of parallel side bars and parallel end bars, said frame being divided by transverse bars into equal sections, a flexible covering-strip secured to the inner side of one of the end bars and to the corresponding side of each of said transverse bars, longitudinal top and bottom rods secured to the end bars and the transverse bars, and means for moving said flexible covering-strips longitudinally of the main frame in both directions between said rods, substantially as shown and described.

8. A cover or protector for fruits and vegetables, consisting of a main frame composed of parallel side bars and parallel end bars, said frame being divided by transverse bars into equal sections, a flexible covering-strip secured to the inner side of one of the end bars and to the corresponding side of each of said transverse bars, longitudinal top and bottom rods secured to the end bars and the transverse bars, and means for moving said flexible covering-strips longitudinally of the frame in both directions between said rods, said transverse bars being also provided with shields or protectors for said covering-strips, substantially as shown and described.

In testimony that I claim the foregoing as my invention I have signed my name, in presence of the subscribing witnesses, this 21st day of August, 1899.

JOHN HENRY ROLLINS.

Witnesses:
W. KILMER,
W. H. HOWARD.